J. A. ELLISON.
DIRIGIBLE HEADLIGHT.
APPLICATION FILED APR. 10, 1912.
1,045,008.
Patented Nov. 19, 1912.
2 SHEETS—SHEET 1.
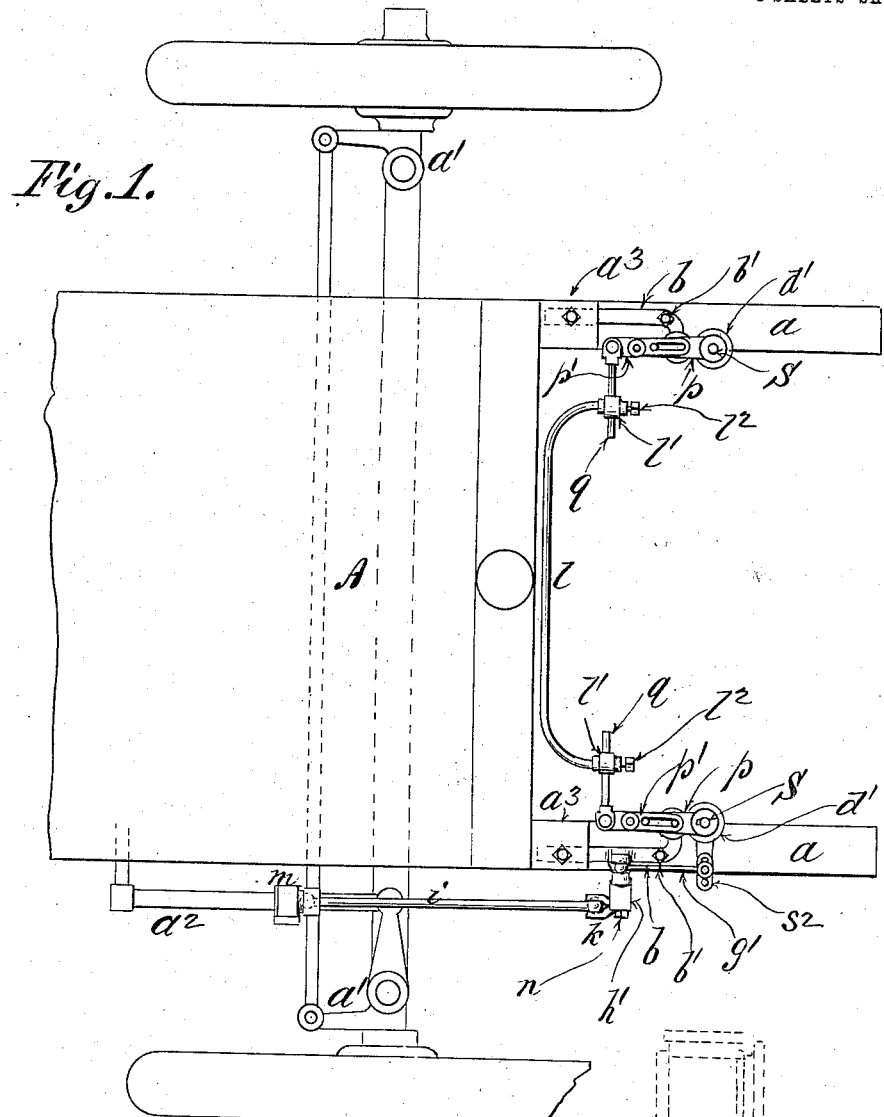
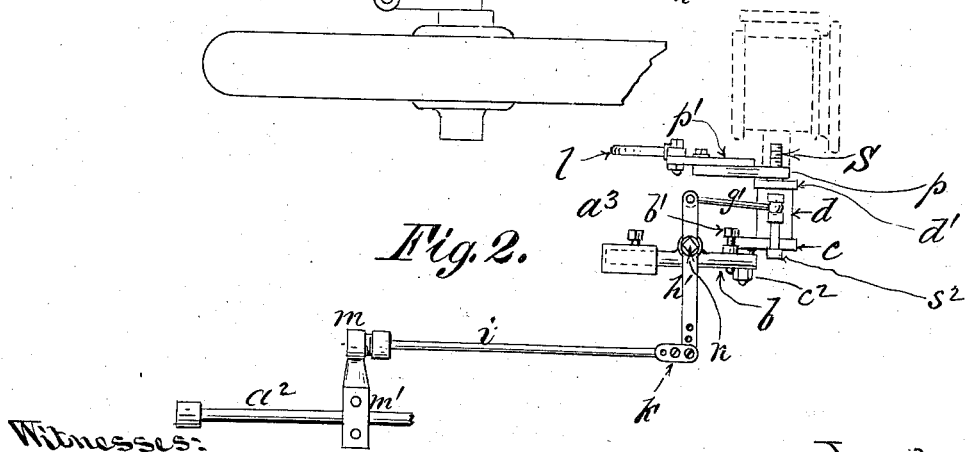

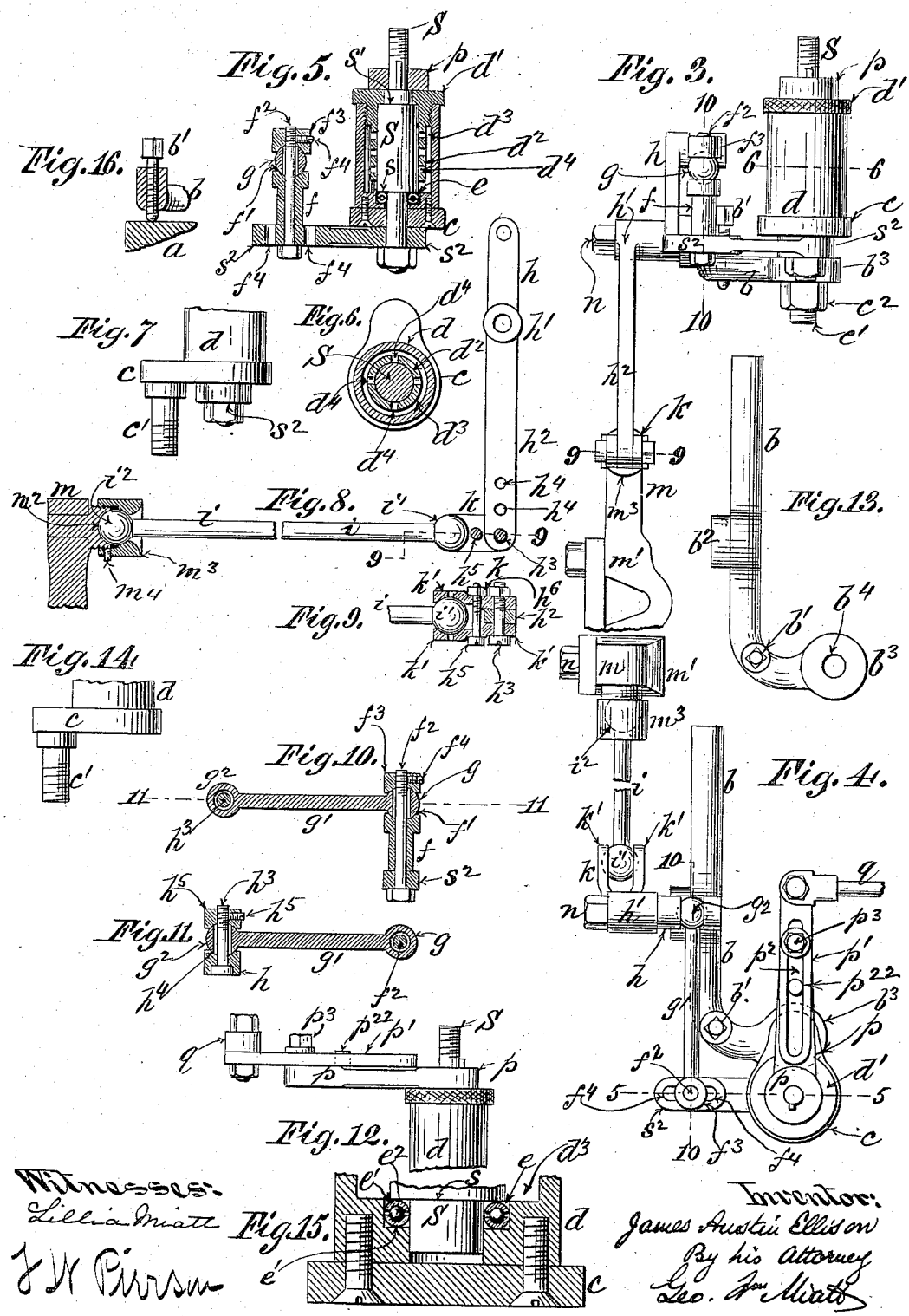

UNITED STATES PATENT OFFICE.

JAMES AUSTIN ELLISON, OF WILMINGTON, DELAWARE.

DIRIGIBLE HEADLIGHT.

1,045,008.  Specification of Letters Patent.  Patented Nov. 19, 1912.

Application filed April 10, 1912. Serial No. 689,714.

*To all whom it may concern:*

Be it known that I, JAMES AUSTIN ELLISON, a citizen of the United States, residing at Wilmington, in the county of Newcastle and State of Delaware, have invented certain new and useful Improvements in Dirigible Headlights, of which the following is a specification.

My invention relates to the class of apparatus employed in conjunction with the steering gear of an automobile to effect the automatic turning of the search or head lights in unison and substantially in parallelism with the front wheels of the vehicle, for the purpose of projecting the light in the line of travel, which is desirable for well known and obvious reasons.

Owing to diversity of sizes and types of automobiles known to the trade, and the consequent varying and exacting requirements encountered in adapting automatic lamp swivel mechanism to automobiles generally, the results heretofore attained have not been satisfactory in a practical or commercial sense.

The main object of my invention is to afford apparatus of the character designated that shall be essentially standard in character in that it may be applied with equal facility to automobiles of different sizes, styles and manufactures, and at the same time be free from certain well known defects heretofore inherent in the use of lamp swivel actuating mechanism, such for instance as either stiffness, strain, and binding between the articulated parts, or a looseness and play thereof, which is equally objectionable.

In other words I attain essentially a degree of universality of adjustment between the parts of my apparatus that adapts it to the specific requirements of the various makes of cars, and also attain perfect articulation between the joints and connections, thereby avoiding objectional binding as well as lost motion, and consequently eliminating noise, excessive wear, &c., and insuring accuracy and smoothness of operation.

The invention consists in the specific construction and arrangement of parts herein described and claimed, distinguishing features being the formation of the connections between the vehicle steering gear and the lamp spindles with "universal" or ball and socket joints that compensate for variations in inclination or alinement, and the provision of means for adjusting the length of parts to meet the particular dimensions and construction of each individual car.

Incidentally my invention also includes a special construction of the coupling rod between the lamp spindles, whereby more space is afforded for "cranking" the engine, &c., all as hereinafter more fully set forth.

As it is customary to provide two head or search lights on an automobile I herein show and describe such duplex arrangement, it being understood that the main features of my invention are applicable to one or a plurality of lamps as may be found most expedient. Furthermore my mechanism for deriving motion directly from the steering gear is shown as mounted and arranged on the right hand side of the automobile, and for convenience of illustration and description I herein designate certain parts as right hand or left hand parts, although this is not material as it is obvious that under certain conditions the relative arrangement of parts might be reversed with like result.

In the accompanying drawings, Figure 1, is a diagrammatic plan illustrating the practical application of my improved apparatus to an automobile car, which is represented in partial outline only; Fig. 2, is a side elevation of the operative parts shown in Fig. 1; Fig. 3, is a front elevation, upon an enlarged scale, of the operative parts shown on the right side of the car in Fig. 1, the clamp for attachment to the steering gear being partly broken away; Fig. 4, is a top view of the parts shown in Fig. 3, the transmitting rod being broken away centrally; Fig. 5, is a vertical sectional elevation taken upon plane of line 5—5 Fig. 4; Fig. 6, is a horizontal section taken upon plane of line 6—6 Fig. 3; Fig. 7, is an elevation showing a detail of the right hand lamp spindle bracket &c.; Fig. 8, is a sectional elevation showing details of the transmitter rod joints &c., the rod being broken away centrally; Fig. 9, is a sectional elevation showing the joint between the transmitter rod and the rock lever, taken upon plane of line 9—9 Figs. 3 and 8; Fig. 10, is a sectional elevation taken upon plane of lines 10—10, Figs. 3 and 4, showing the lamp spindle connection rod and joints; Fig. 11, is a sectional elevation of the lamp spindle connecting rod and joints taken upon plane of line 11—11, Fig. 10; Fig. 12, is an elevation showing the thrust arm &c. on the right hand side of the apparatus; Fig. 13, is a top view of the right hand trunnion bracket; Fig. 14, is a detail view of the left hand lamp bracket and part of its lamp spindle casing; Fig. 15, is a sectional detail, full size, showing the form of anti-friction or ball bearing provided for each lamp spindle,—the left hand spindle and casing being represented; Fig. 16, a sectional detail illustrating the use of the anti-vibration bearing screws on the trunnion brackets.

In Fig. 1, A, indicates the hood of an automobile, and $a$, $a$, stationary parts of the frame work of the machine, $a'$, $a'$, being the steering knuckles, and $a^2$, the member of the steering gear which actuates the same.

Socket sleeves $a^3$, $a^3$, rigidly attached to stationary parts of the machine, as $a$, $a$, or otherwise formed thereon, afford means of support for the trunnion brackets $b$, $b$, one of which, the one on the right hand side, is shown in detail in Fig. 13. The other or left hand side trunnion bracket is substantially the same in form and structure except that its parts are reversed in projection. These trunnion brackets $b$, $b$, are not only supported fixedly in the socket sleeves $a^3$, $a^3$, or equivalents, but each is provided with a bearing screw $b'$, for engagement with a stationary part of the machine as illustrated in Fig. 16, for the purpose of reinforcing the outer end of each trunnion bracket and preventing vibration,—the bearing screw $b'$, being situated between the rock lever trunnion bearing $b^2$, and the lamp bracket trunnion bearing $b^3$, and hence approximately in the medial line of strain.

Each lamp bracket $c$, $c$, is formed with a threaded trunnion $c'$, which passes through the hole $b^4$, formed for its reception in the bearing $b^3$, of the trunnion bracket $b$, and is secured in position thereon by a nut $c^2$. The brackets $c$, $c$, may thus be set at any desired angle horizontally either to the right or the left as may be found necessary or expedient in adapting the parts to the requirements of a use in particular cases.

Upon each lamp bracket $c$, is rigidly mounted a lamp spindle bearing cylinder $d$, containing an annular anti-friction device $e$, upon which an annular shoulder $s$, on the lamp spindle S, rests. A screw cap $d'$, engaging with the upper end of the cylinder $d$, bears upon another annular shoulder $s'$, on the lamp spindle S, and holds the latter down upon its anti-friction seat. This cap $d'$, is also formed with a cylindrical sleeve $d^2$, which centralizes and supports the spindle laterally within the lubrication chamber $d^3$, formed in the bearing cylinder $d$,—said sleeve being provided with holes $d^4$, which facilitate the lubrication of the spindle S.

The anti-friction device may consist of any desired or well known arrangement of ball bearings, that shown in the drawings, and particularly in Fig. 15, thereof, comprising two annular grooved rings $e'$, $e'$, inverted with relation to each other and having a series of balls $e^2$, $e^2$, interposed between them. Thus mounted, and with a suitable lubricant in the chamber $d^3$, of the bearing cylinder $d$, the perfect alinement of each spindle is assured, and it turns freely on its longitudinal axis with a minimum of frictional resistance. Hence the lamp, mounted upon the upper end of the spindle as indicated in dotted lines in Fig. 2, will have an even, uniform motion, and will afford but slight resistance to change in position.

The construction and arrangement of the right and left hand lamp spindles S, bearing cylinders &c., is alike in every particular except that in the case of the right hand spindle its lower end extends through and below the bearing cylinder and the supporting brackets $c$, as shown more particularly in Fig. 5, to afford means for the rigid attachment of the lamp shifting arm $c^2$, whereas in the case of the left hand spindle its lower end does not protrude but is inclosed as shown in Fig. 15, since this spindle derives its motion indirectly from the right hand spindle as hereinafter set forth.

On the outer end of the lamp-shifting arm $s^2$, is mounted a hollow wrist post $f$, (see Figs. 10 and 11) the upper extremity of which is formed with a concave seat $f'$, for the under side of the spheroidal knuckle $g$, forming one end of the intermediate link rod $g'$, the other end of which rod is also formed with a spheroidal knuckle $g^2$, which is seated on the upper arm $h$, of the rock lever $h'$. Extending upward from the lamp-shifting arm $s^2$, and through the hollow wrist post $f$, and spheroidal knuckle $g$, is the screw bolt $f^2$, with the upper end of which engages the screw cap $f^3$, the inner surface of which fits over the spheroidal surface of the knuckle $g$, thereby confining and holding said knuckle to its seat. A set screw $f^4$, may be used to lock the nut cap $f^3$, in position, by loosening which when necessary, the cap nut $f^4$, may be re-set to compensate for wear or looseness and to prevent lost motion between the parts. The transverse opening in the spheroidal knuckle $g$, is of greater diameter than the bolt $f^2$, so that the knuckle is allowed a prescribed degree of motion in all directions on its seat.

The spheroidal knuckle $g^2$, on the other extremity of the intermediate link rod $g'$, is seated in a similar manner in a concavity $h^{44}$, formed on the inner side of the short arm $h$, of the rock lever $h'$,—a screw stud or bolt $h^3$, the head of which is countersunk in the lever, projecting through a lateral opening in the knuckle $g^2$, and engaging a nut cap $h^5$, as shown more particularly in Fig. 11. A set screw $h^c$, locks the nut $h^5$, in place and admits of adjustment for wear &c., as in the case of the knuckle $g$; and the hole in the knuckle $g^2$, is also larger than the diameter of the bolt $h^3$, to admit of a prescribed degree of motion in all directions. It is to be noted in this connection that the holes in the knuckles $g$, $g^2$, are at right angles to each other, as are also of course the bolts $f^2$, $h^3$, one extending vertically and the other horizontally, so that a practically universal adaptability of inclination and movement of the intermediate link rod $g'$, is afforded within prescribed limits, which are however amply sufficient to allow the said intermediate link rod to accommodate itself to various and varying conditions of use. This adaptability is still further contributed to by forming the lamp shifting lever arm $s^2$, with a plurality of holes $f^4$, for the accommodation of the screw bolt $f^2$, so that any radical change in the position or horizontal inclination of the lamp spindle bearing $d$, with relation to the rock lever $h'$, may be compensated for without interfering with the proper alinement of the light parallel to the front wheels of the vehicle. For instance if it should be necessary to turn the lamp bracket $c$, inward on its trunnion $c'$, toward the center of the machine, or vice versa, the bolt $f^2$, and connections may be set on either side of the medial position in which they are shown in the drawings, which fact will be understood particularly by reference to Figs. 4 and 5.

The rock lever $h'$, is fulcrumed on a trunnion $n$ which is in the form of a screw bolt engaging the trunnion bearing $b^2$, on the right hand trunnion bracket $b$. Its lower or long arm $h^2$, is connected with the transmitting rod $i$, by a link $k$, consisting of two clamping jaws $k'$, $k'$, between which is seated a spheroidal knuckle $i'$, on the transmitting rod $i$, the other end of said transmitting rod $i$, being formed with another spheroidal knuckle $i^2$, seated in the arm $m$, of the steering gear clamp $m'$. By this arrangement of the rock lever the motion derived from the steering gear is reversed, causing the lamps to turn simultaneously, in the same direction as the forward wheels and parallel thereto.

The clamping jaws $k'$, $k'$, are shown particularly in Fig. 9, by reference to which it will be seen that a coupling bolt $h^3$, is used to pivotally connect the link $k$, with the lower arm $h^2$, of the rock lever $h'$; and to provide for the adjustment vertically of the link $k$, upon said lever, the latter is formed with a plurality of bolt holes $h^4$, $h^4$, by which means a mean or general adjustment in inclination of the transmitting link $i$, between the rock lever $h'$, and the steering gear clamp $m'$, may be effected. Thus if the relative position of the steering gear clamp $m'$, is higher than that shown in Figs. 2 and 5 of the drawings, the coupling bolt $h^3$, will be passed through one of the higher bolt holes $h^4$, as required, to bring the transmitting rod $i$, into approximately horizontal position. The inner sides of the clamping jaws $k'$, $k'$, are formed with concavities to seat the spheroidal knuckle $i'$, as shown in Fig. 9; and a clamping screw bolt $h^5$, and nut $h^6$, is provided to insure a proper contact between the parts.

The transmitting rod $i$, is not itself made adjustable in length because the steering gear clamp $m'$, is adjustable upon the steering member $a^2$, from which motion is derived, and hence a normal length of transmitting rod $i$, will answer for all purposes.

The rear spheroidal knuckle $i^2$, of the transmitting rod $i$, is seated in a concavity $m^2$, near the upper end of the arm $m$, of the steering gear clamp $m'$, as shown in Fig. 8, and is held thereto by screw cap nut $m^3$, provided with a set screw $m^4$. Both the spheroidal knuckles $i'$, and $i^2$, on the transmitting rod $i$, are made solid and integral therewith, and afford a wide range of inclination and play, so that perfect or even approximate alinement between the lower arm $h^2$, of the rock lever $h'$, and the steering gear clamp $m'$, is not essential, thereby obviously adapting my lamp swivel apparatus to variations in the form and proportions of cars to which it may be applied, especially when taken in conjunction with the ball and socket articulation of the intermediate link rod $g'$, and the provision for adjustment thereof, and of the lamp bracket $c$, coupling links $k$, &c., as hereinbefore set forth. The screw cap nut $m^3$, is placed upon the transmitting rod $i$, before the formation thereon of one or the other of the spheroidal knuckles $i'$, and $i^2$.

So far I have described my apparatus as related mainly to and in connection with the steering gear of the machine. Where two lamps are to be connected to move in unison, I provide each lamp spindle $S$, where it protrudes above the cap $d'$, with a thrust arm $p$, keyed thereto, and carrying an adjustable extension $p'$, to which a coupling tongue $q$, is pivotally connected. On these coupling tongues $q$, $q$, my coupling rod $l$, is supported,—said link rod being formed with an off-set central portion, the forwardly curved ends of which are provided with sockets $l'$, $l'$, for the reception of the coupling tongues $q$, $q$, as shown in Fig. 1. Binding screws $l^2$, $l^2$, hold the coupling rod securely upon the coupling tongues $q$, $q$, the length of the latter affording a margin for adjustment to machines of different width. My object in this connection being to relegate the coupling rod $l$, to the rear as far as possible, to give free space and access for "cranking" the engine &c., I not only off-set the coupling rod $l$, itself as above stated but I also provide the adjustable extensions $p'$, on the thrust arms $p$, so that the coupling tongues $q$, $q$, may be set back as far as circumstances will permit to bring the rod $l$, itself in close proximity to the front of the hood, as illustrated in Fig. 1. This may be accomplished as shown in the drawings, by forming each extension piece $p'$, with a longitudinal slot $p^2$, into which protrudes a stud $p^{22}$, upon the thrust arm $p$, as shown particularly in Fig. 4, and in providing each thrust arm $p$, with a clamping screw $p^3$, also passing through said slot, for the purpose of holding the extension piece $p'$, rigidly in a prescribed position.

Another advantage attained by my specific construction and arrangement of parts is that it affords convenient means of observing or ascertaining the direction and inclination of the front wheels without the actual necessity of looking at them, which under certain conditions is a great advantage.

What I claim as my invention and desire to secure by Letters Patent is,

1. In lamp swivel mechanism of the character designated, the combination of a lamp spindle and means connected therewith for turning the same by motion derived from the steering gear of the vehicle, said spindle being formed with upper and lower annular shoulders, a bearing cylinder in which said spindle is mounted formed with a ball bearing upon which the lower shoulder of the spindle rests, and a screw cap formed to bear against the upper annular shoulder of said spindle, said bearing cylinder being also formed with a lubricant chamber, for the purpose described.

2. In lamp swivel mechanism of the character designated, the combination of a lamp spindle and means connected therewith for turning the same by motion derived from the steering gear of the vehicle, said spindle being formed with upper and lower annular shoulders, a bearing cylinder in which said spindle is mounted formed with a ball bearing upon which the lower shoulder of the spindle rests, a screw cap formed to bear against the upper annular shoulder of said spindle and having a perforated sleeve embracing the body of the spindle, said bearing cylinder being also formed with a lubricant chamber, for the purpose described.

3. In lamp swivel mechanism of the character designated, the combination of a lamp spindle formed with an upper and a lower annular shoulder, a bearing cylinder in which said spindle is mounted formed with a ball bearing upon which the lower shoulder of the spindle rests, a screw cap formed to bear against the upper annular shoulder of said spindle, an extension of the spindle below the bearing cylinder, and a lamp shifting arm secured to said spindle extension and actuated by motion derived from the steering gear of the vehicle, for the purpose described.

4. In lamp swivel mechanism of the character designated, the combination of a lamp spindle formed with an upper and a lower annular shoulder, a bearing cylinder in which said spindle is mounted formed with a ball bearing upon which the lower shoulder of the spindle rests, a screw cap formed to bear against the upper annular shoulder of said spindle and having a perforated sleeve embracing the body thereof, an extension of the spindle below the bearing cylinder, and a lamp shifting arm secured to said spindle extension and actuated by motion derived from the steering gear of the vehicle, for the purpose described.

5. In lamp swivel mechanism of the character designated, actuated by motion derived from the steering gear of the vehicle, the combination of two lamp spindles suitably mounted, thrust arms, one attached to each of said spindles, laterally projecting coupling tongues, one pivotally attached to each of said thrust arms and extending therefrom in the direction of the other thrust arm, a coupling rod engaging said coupling tongues, and means for clamping said coupling tongues and said coupling rod together, for the purpose described.

6. In lamp swivel mechanism of the character designated, actuated by motion derived from the steering gear of the vehicle, the combination of two lamp spindles suitably mounted, thrust arms attached to each of said spindles, adjustable extensions on said thrust arms, coupling tongues pivotally mounted on said adjustable extensions, a coupling rod engaging said coupling pins, and means for clamping the tongues and coupling rod together, for the purpose described.

7. In lamp swivel mechanism of the character designated, actuated by motion derived from the steering gear of the vehicle, the combination of two lamp spindles suitably mounted, thrust arms attached to said spindles, coupling tongues pivotally mounted on said thrust arms, a coupling rod having bent ends upon which are formed sockets for engagement with said coupling pins, and means for clamping said coupling tongues in said sockets, for the purpose described.

8. In lamp swivel mechanism of the character designated, the combination with the steering gear, of a clamp connected therewith, a transmitting rod articularly connected with said clamp, a rock lever, a link pivotally connected with said transmitting rod and with said rock lever, a lamp spindle, a lamp turning lever attached thereto, and an intermediate link rod interposed between said lamp turning lever and the rock lever and articularly connected with both, as and for the purpose set forth.

9. In lamp swivel mechanism of the character designated, the combination with the steering gear, of a clamp connected therewith, a transmitting rod articularly connected with said clamp, a rock lever, a link pivotally connected with said transmitting rod and with said rock lever, means for adjusting said link vertically on said rock lever, a lamp spindle, a lamp turning lever attached thereto, and an intermediate link rod interposed between said lamp turning lever and the rock lever and articularly connected with both, as and for the purpose set forth.

10. In lamp swivel mechanism of the character designated, the combination of a steering gear clamp, a rock lever, a transmitting rod interposed between and articulately connected with said steering gear clamp and said rock lever, a lamp spindle, a lamp shifting lever arm attached thereto, a hollow wrist post mounted on said lamp shifting lever arm and formed with a ball joint seat, an intermediate link rod interposed between said wrist post and the rock lever and formed with hollow spheroidal knuckles, a screw bolt passing through said hollow wrist post and through one of the hollow spheroidal knuckles on the intermediate link rod, a cap nut engaging said screw bolt, a screw stud on the rock lever passing through the other hollow knuckle on the intermediate link rod, and a cap nut engaging said screw stud on the rock lever, for the purpose described.

11. In lamp swivel mechanism of the character designated, the combination of a steering gear clamp formed with a ball socket, a transmitting rod formed with a spheroidal knuckle fitting thereon, a screw cap nut coupling the knuckle to its seat, a spheroidal knuckle on the other end of said transmitting rod, a rock lever, means on said rock lever for clamping said last named spheroidal knuckle, an intermediate link rod connecting said rock lever with a lamp shifting lever arm, said lever arm, and a lamp spindle connected therewith and mounted in a suitable bearing, for the purpose described.

12. In lamp swivel mechanism of the character designated, the combination of a steering gear clamp formed with a ball socket, a transmitting rod formed with spheroidal end knuckles one of which is seated on the said steering gear clamp, a screw cap nut coupling one of said knuckles to its seat on the said clamp, a clamp link engaging the other spheroidal knuckle on the transmitting rod, and pivotally connected to a rock lever, said rock lever, and an intermediate link rod connecting it articulately with a lamp shifting arm attached to a lamp spindle, for the purpose described.

JAMES AUSTIN ELLISON.

Witnesses:
HARRISON W. HOWELL,
GEO. WM. MIATT.

---

Copies of this patent may be obtained for five cents each, by addressing the "Commissioner of Patents, Washington, D. C."